United States Patent
Kim et al.

(10) Patent No.: US 10,548,449 B2
(45) Date of Patent: Feb. 4, 2020

(54) ROBOT CLEANER

(71) Applicant: LG ELECTRONICS INC., Seoul (KR)

(72) Inventors: Hwang Kim, Seoul (KR); Sungil Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 143 days.

(21) Appl. No.: 15/574,117

(22) PCT Filed: May 25, 2016

(86) PCT No.: PCT/KR2016/005525
§ 371 (c)(1),
(2) Date: Nov. 14, 2017

(87) PCT Pub. No.: WO2016/190658
PCT Pub. Date: Dec. 1, 2016

(65) Prior Publication Data
US 2018/0344118 A1 Dec. 6, 2018

(30) Foreign Application Priority Data

May 26, 2015 (KR) .......................... 10-2015-0073155

(51) Int. Cl.
*A47L 11/40* (2006.01)
*A47L 9/00* (2006.01)
(Continued)

(52) U.S. Cl.
CPC ............. *A47L 11/4063* (2013.01); *A47L 7/02* (2013.01); *A47L 9/009* (2013.01); *B62D 55/06* (2013.01);
(Continued)

(58) Field of Classification Search
CPC ........ B62D 55/104–1086; B62D 55/14; A47L 2201/00
(Continued)

(56) References Cited

U.S. PATENT DOCUMENTS

| 3,533,483 | A | 10/1970 | Ballinger |
| 2002/0017005 | A1 | 2/2002 | Kim et al. |

(Continued)

FOREIGN PATENT DOCUMENTS

| CN | 1575721 | 2/2005 |
| CN | 202714802 U | 2/2013 |

(Continued)

OTHER PUBLICATIONS

International Search Report and Written Opinion dated Sep. 22, 2016 issued in Application No. PCT/KR2016/005525 (Full English Text).

(Continued)

*Primary Examiner* — David Redding
(74) *Attorney, Agent, or Firm* — Ked & Associates, LLP

(57) ABSTRACT

A robot cleaner includes: a cleaner body; a driving unit configured to provide a driving force; a driving pulley connected to the driving unit, and formed to be rotatable by receiving the driving force from the driving unit; first and second driven pulleys disposed at both sides of the driving pulley; and a belt forming a closed loop by entirely enclosing the driving pulley and the first and second driven pulleys, and configured to rotate the first and second driven pulleys when the driving pulley is rotated.

9 Claims, 3 Drawing Sheets

(51) Int. Cl.
*A47L 7/02* (2006.01)
*B62D 55/06* (2006.01)
*B62D 55/125* (2006.01)
*B62D 55/14* (2006.01)
*B62D 55/24* (2006.01)
*F16H 1/20* (2006.01)
*F16H 57/02* (2012.01)

(52) U.S. Cl.
CPC .......... *B62D 55/125* (2013.01); *B62D 55/14* (2013.01); *B62D 55/24* (2013.01); *F16H 1/20* (2013.01); *F16H 57/02* (2013.01); *A47L 2201/00* (2013.01)

(58) Field of Classification Search
USPC ........................................ 180/9.5, 9.52, 9.54
See application file for complete search history.

(56) References Cited

U.S. PATENT DOCUMENTS

| | | |
|---|---|---|
| 2004/0262060 A1 | 12/2004 | Kim |
| 2011/0190933 A1 | 8/2011 | Shein et al. |
| 2012/0261204 A1 | 10/2012 | Won |
| 2013/0061416 A1* | 3/2013 | Dyson .................... A47L 9/009 15/319 |
| 2015/0101135 A1 | 4/2015 | Witelson et al. |
| 2015/0251714 A1* | 9/2015 | Guigan ................ B62B 5/0033 180/9.28 |

FOREIGN PATENT DOCUMENTS

| | | |
|---|---|---|
| EP | 1916070 | 4/2008 |
| GB | 2494443 | 3/2013 |
| JP | 61-202979 | 9/1986 |
| JP | 04-045190 | 2/1992 |
| JP | 10-067346 | 3/1998 |
| JP | 2010-259472 | 11/2010 |
| KR | 20-1996-0020104 | 12/1996 |
| KR | 10-0779195 | 11/2007 |
| KR | 10-2013-0137763 | 12/2013 |
| WO | WO 2014/057177 | 4/2014 |

OTHER PUBLICATIONS

Taiwan Office Action dated Mar. 23, 2017 issued in Application No. 105116474 (with English translation).
Japanese Office Action dated Feb. 5, 2019 issued in Application No. 2018-513254.
European Search Report dated Feb. 18, 2019 issued in Application No. 16800297.0.

* cited by examiner

[Fig. 1]
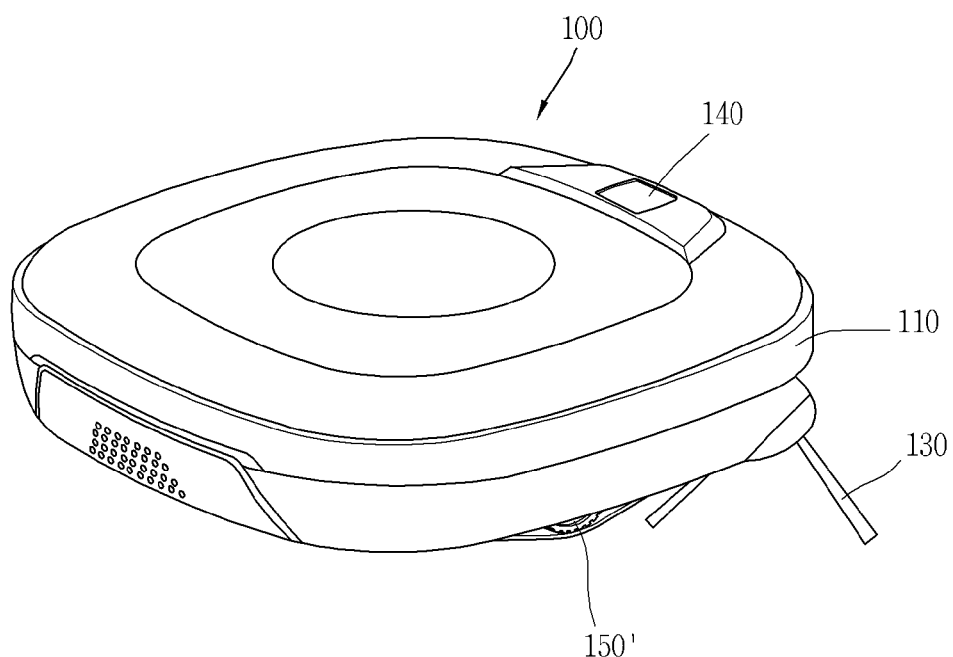
[Fig. 2]
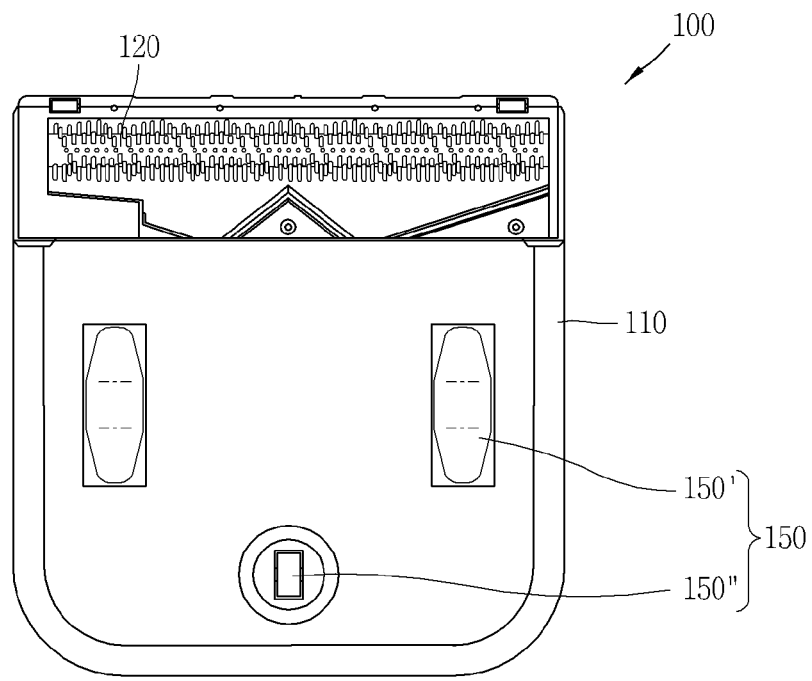

[Fig. 3]
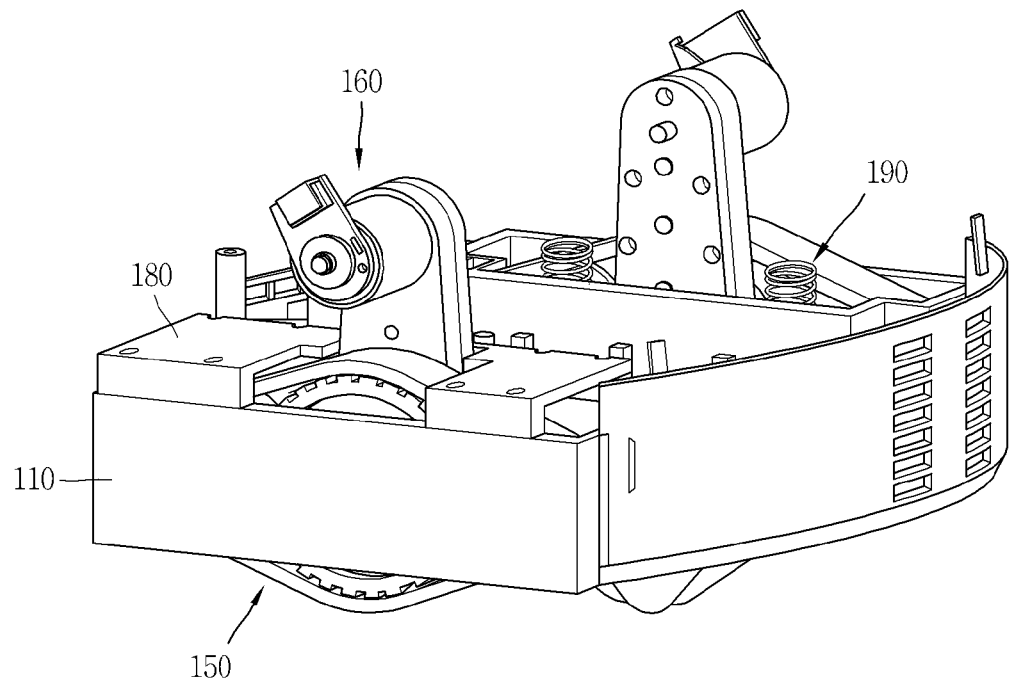
[Fig. 4]
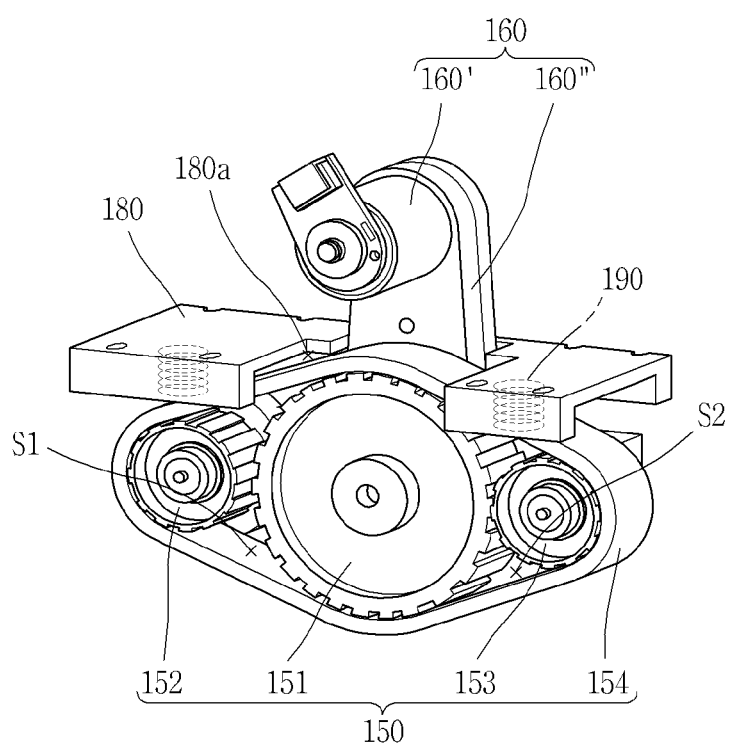

[Fig. 5]
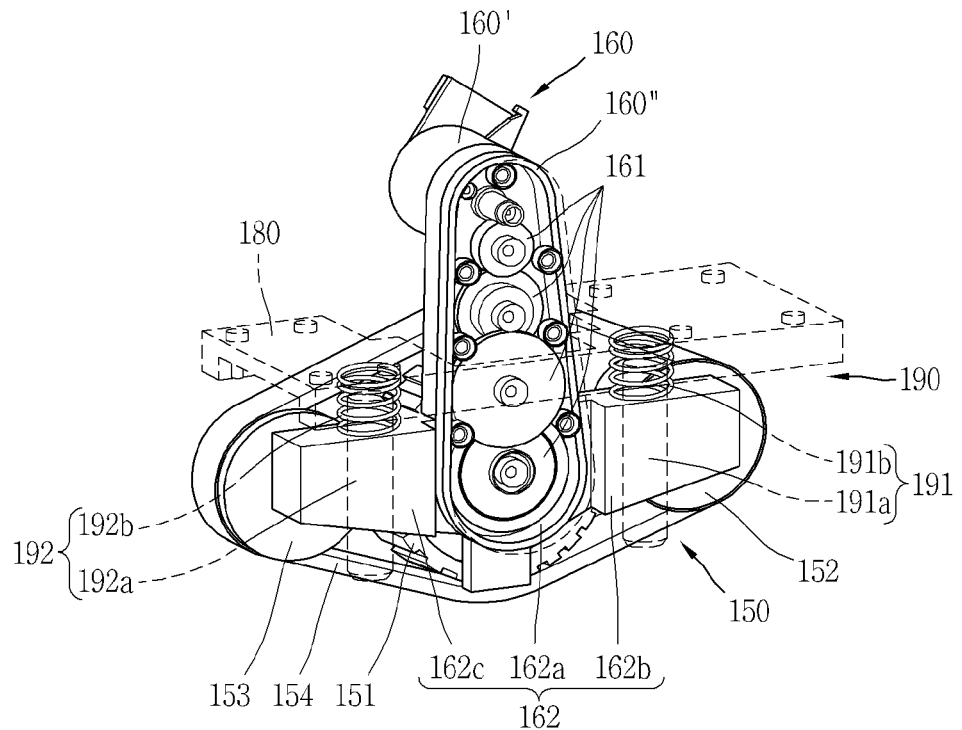
[Fig. 6]
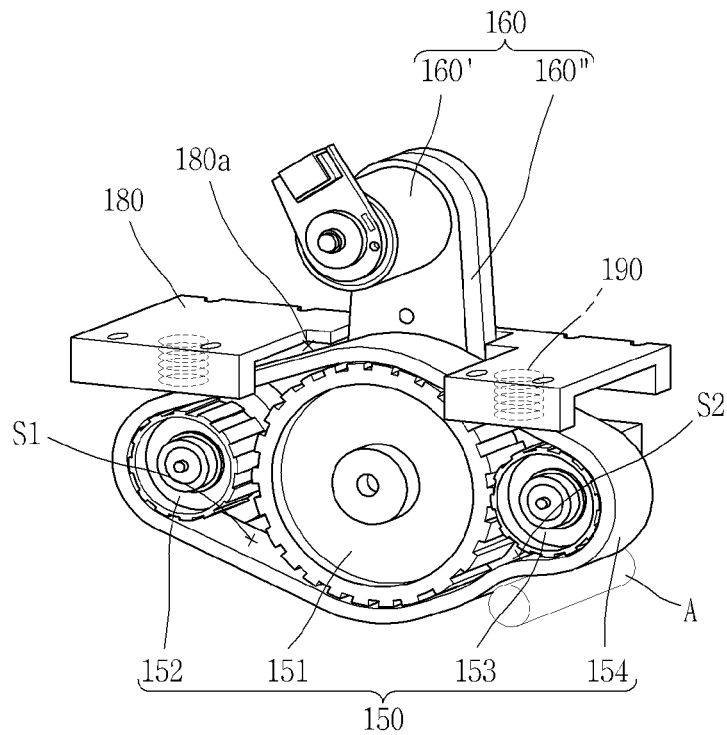

ROBOT CLEANER

CROSS-REFERENCE TO RELATED PATENT APPLICATIONS

This application is a U.S. National Stage Application under 35 U.S.C. § 371 of PCT Application No. PCT/KR2016/005525, filed May 25, 2016, which claims priority to Korean Patent Application No. 10-2015-0073155, filed May 26, 2015, whose entire disclosures are hereby incorporated by reference.

TECHNICAL FIELD

The present invention relates to a robot cleaner, and more particularly, to a robot cleaner capable of cleaning a floor while autonomously running on a predetermined region by a running unit.

BACKGROUND ART

Generally, a vacuum cleaner is an apparatus to suck dust-included air by using a vacuum pressure generated from a suction motor provided in a cleaner body, and then to filter foreign materials from the inside of the cleaner body.

Such a vacuum cleaner is classified into a passive vacuum cleaner manipulated by a user, and a robot cleaner which autonomously performs a cleaning operation without a user's manipulation.

The robot cleaner is an apparatus capable of autonomously performing a cleaning operation while running on a desired cleaning region, according to an input program, by using a charged battery as a driving source.

Generally, the robot cleaner determines a cleaning region by running on a wall or an outer periphery of a region surrounded by obstacles, through a sensor, and then searches for a cleaning path to clean the determined cleaning region. Then, the robot cleaner calculates a running distance and a current position, based on a signal detected from a sensor which detects an rpm and a rotation angle of wheels, and runs on a preset cleaning path.

The robot cleaner is provided with a running unit to move or rotate a cleaner body back and forth and right and left. Generally, the running unit includes main wheels disposed at right and left sides of the cleaner body, and supplementary wheels for assisting a movement of the cleaner body together with the main wheels.

A driving capability of the robot cleaner is mainly determined by the main wheels. The main wheels may have a smaller diameter with respect to a height of an obstacle (e.g., a stairstep-shaped region such as a threshold), or may have a degraded ground contact force according to a material/hardness. This may cause the robot cleaner to have a lowered running performance including a sliding performance on an obstacle.

DISCLOSURE OF INVENTION

Technical Problem

Therefore, an aspect of the detailed description is to provide a robot cleaner having an enhanced running performance including a sliding performance on an obstacle.

Solution to Problem

To achieve these and other advantages and in accordance with the purpose of this specification, as embodied and broadly described herein, there is provided a robot cleaner, including: a cleaner body; a driving unit configured to provide a driving force; a driving pulley connected to the driving unit, and formed to be rotatable by receiving the driving force from the driving unit; first and second driven pulleys disposed at both sides of the driving pulley; and a belt forming a closed loop by entirely enclosing the driving pulley and the first and second driven pulleys, and configured to rotate the first and second driven pulleys when the driving pulley is rotated.

In an embodiment of the present invention, each of the first and second driven pulleys may be formed to have a diameter smaller than that of the driving pulley.

Rotation shafts of the first and second driven pulleys may be disposed on the same line as a rotation shaft of the driving pulley.

The belt may be formed of an elastically-transformable material, and empty spaces for inward-elastic transformation of the belt may be formed between the driving pulley and the first driven pulley, and between the driving pulley and the second driven pulley.

In another embodiment of the present invention, the driving unit may include: a driving motor part configured to generate a driving force; and a gear box part configured to connect the driving motor part with the driving pulley.

The gear box part may include: a gear unit configured to transmit a driving force of the driving motor part to the driving pulley; and a housing including a main housing configured to accommodate the gear unit therein, and first and second sub housings extended toward both sides of the main housing and configured to support the rotation shafts of the first and second driven pulleys, respectively.

The robot cleaner may further include: a support unit disposed to cover the first and second sub housings, and fixed to the cleaner body; and a suspension unit including a first suspension formed between the support unit and the first sub housing, and a second suspension formed between the support unit and the second sub housing.

The first suspension may include: a first guide bar formed to protrude from the support unit and to pass through the first sub housing; and a first spring formed to enclose the first guide bar, and supported by the support unit and the first sub housing. And the second suspension may include: a second guide bar formed to protrude from the support unit and to pass through the second sub housing; and a second spring formed to enclose the second guide bar, and supported by the support unit and the second sub housing.

The support unit may be provided with an opening through which the belt which covers the upside of the driving pulley is partially exposed to the outside.

According to another aspect of the present invention, there is provided a robot cleaner, including: a cleaner body configured to perform a cleaning operation; and a running unit provided at right and left sides of the cleaner body, and formed to be operable independently, wherein the running unit includes: a driving pulley; first and second driven pulleys disposed at both sides of the driving pulley, and formed to have a diameter smaller than that of the driving pulley; and a belt forming a closed loop by entirely enclosing the driving pulley and the first and second driven pulleys.

Advantageous Effects of Invention

The robot cleaner of the present invention may have the following advantages.

Firstly, since the running unit is configured in the form of a caterpillar composed of the driving pulley, the first driven pulley, the second driven pulley and the belt, a ground contact area of the belt may be increased.

Secondly, the first and second driven pulleys having a smaller diameter than the driving pulley are disposed at both sides of the driving pulley, and the driven pulleys are upward-spaced from a floor surface. With such a configuration, both sides of the belt may be upward inclined from the floor surface. This may allow the robot cleaner to have an enhanced sliding performance on an obstacle.

Further, when the running unit slides on an obstacle, the belt is inwardly elastically-transformed toward empty spaces formed between the driving pulley and the first driven pulley, and between the driving pulley and the second driven pulley. This may enhance a sliding performance of the robot cleaner on an obstacle.

Further, since the suspension unit operated up and down is provided at both sides of the driving pulley, both sides of the driving pulley may have a balanced ground contact force.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1 is a perspective view of a robot cleaner according to an embodiment of the present invention;

FIG. 2 is a bottom view of the robot cleaner shown in FIG. 1;

FIG. 3 is a conceptual view illustrating a position of a running unit in the robot cleaner of FIG. 1;

FIG. 4 is a disassembled perspective view of the running unit shown in FIG. 3;

FIG. 5 is a view illustrating the inside of the running unit shown in FIG. 4; and FIG. 6 is a conceptual view illustrating that the running unit of FIG. 4 slides on an obstacle.

BEST MODE FOR CARRYING OUT THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated.

In general, a suffix such as "module" and "unit" may be used to refer to elements or components. Use of such a suffix herein is merely intended to facilitate description of the specification, and the suffix itself is not intended to give any special meaning or function.

In the present disclosure, that which is well-known to one of ordinary skill in the relevant art has generally been omitted for the sake of brevity.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

FIG. 1 is a perspective view of a robot cleaner 100 according to an embodiment of the present invention, and FIG. 2 is a bottom view of the robot cleaner 100 shown in FIG. 1.

Referring to FIGS. 1 and 2, the robot cleaner 100 performs a cleaning operation by sucking foreign materials-included dust on a floor, while autonomously running on a predetermined region.

The robot cleaner 100 is configured to suck dust-included air through a suction unit 120, by using a vacuum pressure generated from a suction motor (not shown) mounted to the inside of a cleaner body 110, and then to filter foreign materials therein. Side brushes 130 are rotatably disposed at both sides of the suction unit 120, and are configured to collect dust formed at both sides of the cleaner body 110 into the suction unit 120.

The cleaner body 110 is configured to accommodate components therein, and to run on a floor by a running unit 150. A controller (not shown) for controlling an overall operation of the robot cleaner 100, a power supply unit (not shown) for supplying power required to drive the robot cleaner, various types of sensors 140, etc. may be provided at the cleaner body 110.

The running unit 150 is configured to move or rotate the cleaner body 110 back and forth and right and left. The running unit 150 includes main wheels 150' and supplementary wheels 150".

The main wheels 150' are provided at right and left sides of the cleaner body 110, and are formed to be rotatable in one direction or another direction under control of a controller. The main wheels 150' may be driven independently from each other. For instance, the main wheels 150' may be driven by different driving motor parts 160'.

The supplementary wheels 150" are configured to support the cleaner body 110 together with the main wheels 150', and are configured to assist a movement of the cleaner body 110 by the main wheels 150'.

As aforementioned in the background of the present invention, a driving capability of the robot cleaner 100 is mainly determined by the main wheels 150'. However, as the robot cleaner 100 is formed to have a flat shape with a low height from a floor surface, there is a limitation in increasing a diameter of the main wheels 150'. Accordingly, the main wheels 150' may have a smaller diameter with respect to a height of an obstacle (e.g., a stairstep-shaped region such as a threshold), or may have a degraded ground contact force according to a material/hardness. This may cause the robot cleaner to have a lowered running performance including a sliding performance on an obstacle.

Hereinafter, will be explained the robot cleaner 100 having an enhanced running performance including a sliding performance on an obstacle, by solving such a problem.

FIG. 3 is a conceptual view illustrating the running unit 150 in the robot cleaner 100 of FIG. 1. FIG. 4 is a disassembled perspective view of the running unit 150 shown in FIG. 3. And FIG. 5 is a view illustrating the inside of the running unit 150 shown in FIG. 4.

The running unit 150 is provided at right and left sides of the cleaner body 110, and is applied to the main wheels 150' formed to be operable independently from each other. However, the present invention is not limited to this. That is, the running unit 150 may be applicable to the supplementary wheels 150" as well as the main wheels 150'.

Referring to FIGS. 3 to 5, the running unit 150 is configured in the form of a caterpillar composed of a driving pulley 151, a first driven pulley 152, a second driven pulley 153 and a belt 154.

The driving pulley 151 is connected to a driving unit 160 for providing a driving force, and is formed to be rotatable by receiving a driving force from the driving unit 160. The driving unit 160 will be explained in more detail later.

The first driven pulley 152 and the second driven pulley 153 are disposed at both sides of the driving pulley 151. As shown, each of the first and second driven pulleys 152, 153 may be formed to have a diameter smaller than that of the driving pulley 151. Further, the first and second driven pulleys 152, 153 may be formed to have the same-sized diameter.

An external part of each of the driving pulley 151, the first driven pulley 152 and the second driven pulley 153 may be formed of an elastically-transformable material. For instance, the driving pulley 151 may include a central part formed of a rigid material, and an external part formed of an elastic material and enclosing the central part.

As shown in FIG. 3, the cleaner body 110 may be formed to cover at least part of the outside of the driving pulley 151, the first driven pulley 152 and the second driven pulley 153.

The belt 154 is formed as a closed loop which encloses the driving pulley 151, the first driven pulley 152 and the second driven pulley 153. And the belt 154 is configured to rotate the first driven pulley 152 and the second driven pulley 153 when the driving pulley 151 is rotated. More specifically, once the driving pulley 151 is rotated by receiving a driving force through the driving unit 160, the belt 154 connected to the driving pulley 151 is rotated together. As the belt 154 is rotated, the first and second driven pulleys 152, 153 are rotated together.

The belt 154 is formed of an elastically-transformable material (e.g., rubber, urethane, etc.). And part of the belt 154 contacts a floor to provide a frictional force, such that the running unit 150 runs on the floor. As the belt 154 is formed to enclose the first and second driven pulleys 152, 153 provided at both sides of the driving pulley 151, the belt 154 may be formed to be long. This may increase a ground contact area of the belt 154.

As a frictional force with the belt 154 is increased, each of the driving pulley 151, the first driven pulley 152 and the second driven pulley 153 may have an outer circumferential surface of a convex-concaved shape (凹凸).

In a state where the driving pulley 151 is disposed on a flat floor surface, the first and second driven pulleys 152, 153 may be disposed at a position upward-spaced from the floor surface. In the drawings, rotation shafts of the first and second driven pulleys 152, 153 are disposed on the same line as a rotation shaft of the driving pulley 151.

The first and second driven pulleys 152, 153 having a smaller diameter than the driving pulley 151 are disposed at both sides of the driving pulley 151, and the driven pulleys 152, 153 are upward-spaced from a floor surface. With such a configuration, both sides of the belt 154 which faces the floor surface are upward inclined from the floor surface. This may allow the robot cleaner to have an enhanced sliding performance on an obstacle.

Empty spaces (S1, S2) for inward-elastic transformation of the belt 154 may be formed between the driving pulley 151 and the first driven pulley 152, and between the driving pulley 151 and the second driven pulley 153. The empty spaces are designed for transformation of the belt 154 in correspondence to an external shape of an obstacle, while the running unit 151 slides on the obstacle.

FIG. 6 is a conceptual view illustrating that the running unit 150 of FIG. 4 slides on an obstacle (A).

As shown, once the belt 154 between the driving pulley 151 and the second driven pulley 153 is inward elastically-transformed in correspondence to an external shape of the obstacle (A), a contact area of the belt 154 to the obstacle (A) is increased. This may enhance a sliding performance of the robot cleaner on the obstacle (A).

The running unit 150 may further include a cap (not shown) configured to prevent penetration of foreign materials by covering the driving pulley 151, the first driven pulley 152 and the second driven pulley 153. The cap may be formed to cover the driving pulley 151, the first driven pulley 152 and the second driven pulley 153, at a time.

Hereinafter, a detailed structure of the driving unit 160, a suspension structure, etc. will be explained.

The driving unit 160 includes a driving motor part 160' and a gear box part 160".

The driving motor part 160' includes a driving motor (not shown) for generating a driving force, and an encoder (not shown) for outputting information of the driving motor such as a rotation angle and a speed, in the form of an electric signal. The driving motor is formed to be rotatable in two directions, and the controller controls driving of the driving motor (a rotation direction, a rotation angle, a rotation speed, etc.) based on information obtained from the encoder.

The gear box part 160" connects the driving motor part 160' with the driving pulley 151, and includes a gear unit 161 and a housing 162.

The gear unit 161 transmits a driving force of the driving motor part 160' to the driving pulley 151. The gear unit 161 is composed of a plurality of gears, and is configured to transmit a rotation speed and a torque to the driving pulley 151 by properly changing them through a control of a gear ratio.

The housing 162 includes a main housing 162a for accommodating the gear unit 161 therein, and first and second sub housings 162b, 162c extended toward both sides of the main housing 162a and configured to support the rotation shafts of the first and second driven pulleys 152, 153, respectively.

The robot cleaner 100 is provided with a suspension device for absorbing an impact in order to prevent an impact of a floor surface from being transferred to the cleaner body 110. The suspension device includes a support unit 180 and a suspension unit 190.

The support unit 180 is disposed to cover the first and second sub housings 162b, 162c, and is fixed to the cleaner body 110. The support unit 180 may be modularized together with other components, as one component of the running unit 150. With such a configuration, it is advantageous that the pre-manufactured running unit 150 is completely installed at the cleaner body 110 through a simple assembly process by the support unit 180. On the contrary, the support unit 180 may be integrally formed with the cleaner body 110.

The suspension unit 190, operated up and down, is provided at both sides of the driving pulley 151. As shown, the suspension unit 190 includes a first suspension 191 formed between the support unit 180 and the first sub housing 162b, and a second suspension 192 formed between the support unit 180 and the second sub housing 162c.

The first suspension 191 may include a first guide bar 191a and a first spring 191b.

The first guide bar 191a is formed to protrude from the support unit 180 and to pass through the first sub housing 162b. In order to prevent the first guide bar 191a inserted into the first sub housing 162b from being separated from the first sub housing 162b, a separation prevention structure may be provided on at least one of the first guide bar 191a and the first sub housing 162b.

The first spring 191b is formed to enclose the first guide bar 191a, and is supported by the support unit 180 and the first sub housing 162b. In this embodiment, the first spring 191b is configured as a coil spring. However, the present invention is not limited to this. The first spring 191b may be configured as a plate spring, and may be installed at the first guide bar 191a.

Likewise, the second suspension 192 may include a second guide bar 192a and a second spring 192b.

The second guide bar 192a is formed to protrude from the support unit 180 and to pass through the second sub housing 162c. In order to prevent the second guide bar 192a inserted into the second sub housing 162c from being separated from the second sub housing 162c, a separation prevention structure may be provided on at least one of the second guide bar 192a and the second sub housing 162c.

The second spring 192b is formed to enclose the second guide bar 192a, and is supported by the support unit 180 and the second sub housing 162c. In this embodiment, the second spring 192b is configured as a coil spring. However, the present invention is not limited to this. The second spring 192b may be configured as a plate spring, and may be installed at the second guide bar 192a.

As the suspension unit 190 operated up and down is provided at both sides of the driving pulley 151, both sides of the driving pulley 151 may have a balanced ground contact force.

The support unit 180 may be provided with an opening 180a through which the belt 154 which covers the upside of the driving pulley 151 is partially exposed to the outside. In this case, the driving pulley 151 may be designed to have a larger diameter.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A robot cleaner, comprising:
a cleaner body;
a drive configured to provide a driving force;
a driving pulley connected to the drive, and configured to be rotatable by receiving the driving force from the drive;
a first driven pulley provided at a first side of the driving pulley and a second driven pulley provided at a second side of the driving pulley opposite the first side; and
a belt forming a closed loop by entirely enclosing the driving pulley and the first and second driven pulleys, and configured to rotate the first and second driven pulleys when the driving pulley is rotated,
wherein the drive comprises:
a housing including a main housing configured to support the rotation shaft of the driving pulley; and
a first sub housing that extends toward a first side of the main housing corresponding to the first side of the driving pulley and a second sub housing that extends toward a second side of the main housing corresponding to the second side of the driving pulley and configured to support the rotation shafts of the first and second driven pulleys, respectively; and wherein the robot cleaner further comprises:
a support plate that covers the first and second sub housings and is fixed to the cleaner body; and
a suspension including a first suspension formed between the support plate and the first sub housing, and a second suspension formed between the support plate and the second sub housing.

2. The robot cleaner of claim 1, wherein each of the first and second driven pulleys is formed to have a diameter smaller than that of the driving pulley.

3. The robot cleaner of claim 2, wherein rotation shafts of the first and second driven pulleys are disposed on the same transverse line as a rotation shaft of the driving pulley, the transverse line being perpendicular to the rotation shafts of the first and second driven pulleys and the driving pulley.

4. The robot cleaner of claim 3, wherein the belt is formed of an elastically-transformable material, and
wherein empty spaces for inward-elastic transformation of the belt are formed between the driving pulley and the first driven pulley, and between the driving pulley and the second driven pulley.

5. The robot cleaner of claim 1, wherein the drive includes:
a driving motor configured to generate a driving force; and
a gear box configured to connect the driving motor with the driving pulley.

6. The robot cleaner of claim 5, wherein the gear box includes:
a plurality of gears configured to transmit a driving force of the driving motor to the driving pulley; and
the housing including the main housing configured to accommodate the gear unit therein, and the first and second sub housings.

7. The robot cleaner of claim 1, wherein the first suspension includes:
a first guide bar formed to protrude from the support plate and to pass through the first sub housing; and
a first spring formed to enclose the first guide bar, and supported by the support plate and the first sub housing, and wherein the second suspension includes:
- a second guide bar formed to protrude from the support plate and to pass through the second sub housing; and
- a second spring formed to enclose the second guide bar, and supported by the support plate and the second sub housing.

8. The robot cleaner of claim 1, wherein the support plate is provided with an opening through which the belt which covers a top of the driving pulley is partially exposed to the outside.

9. A robot cleaner, comprising:
a cleaner body configured to perform a cleaning operation; and a running unit provided at right and left sides of the cleaner body, and formed to be operable independently,
wherein the running unit includes:
- a driving pulley;
- a first driven pulley provided at a first side of the driving pulley and a second driven pulley provided at a second side of the driving pulley opposite the first side, and formed to have a diameter smaller than that of the driving pulley;
- a belt forming a closed loop by entirely enclosing the driving pulley and the first and second driven pulleys, and
- a drive configured to provide a driving force,
wherein the drive comprises:
  - a housing including a main housing configured to support the rotation shaft of the driving pulley; and
  - a first sub housing that extends toward a first side of the main housing corresponding to the first side of the driving pulley and a second sub housing that extends toward a second side of the main housing corresponding to the second side of the driving pulley and configured to support the rotation shafts of the first and second driven pulleys, respectively, and wherein the robot cleaner further comprises:
- a support plate that covers the first and second sub housings and is fixed to the cleaner body; and
- a suspension including a first suspension formed between the support plate and the first sub housing, and a second suspension formed between the support plate and the second sub housing.

* * * * *